Patented Jan. 9, 1940

2,186,732

UNITED STATES PATENT OFFICE 2,186,732

SILVER HALIDE EMULSION FOR COLOR PHOTOGRAPHY

Wilhelm Schneider and Alfred Fröhlich, Dessau, Anhalt, Germany, assignors, by mesne assignments, to Agfa Ansco Corporation, Binghamton, N. Y., a corporation of Delaware No Drawing. Application August 17, 1937, Serial No. 159,518. In Germany August 29, 1936

17 Claims. (Cl. 95—6)

Our present invention relates to silver halide emulsions for color photography.

One of its objects is to provide silver halide emulsions containing new dyestuff components. Further objects will be seen from the detailed specification following hereafter.

The new dye formers which are fast to diffusion in the colloid layer are produced by introducing into the molecule of a dye component a carbohydrate residue. This may be accomplished in several ways. For example, one or more of the hydroxyl groups of the carbohydrate may be esterified or etherified with corresponding groups of a dyestuff intermediate product or by producing an acid amide combination between the amino group of a carbohydrate derivative, for example a glucamine, and the carboxyl group of a dyestuff former there may be obtained the corresponding dyestuff component fast to diffusion. Also there may be produced a Schiff's Base from an amino-carbohydrate and a dyestuff component containing an aldehyde group, for example α-naphthol aldehyde. Again a naphthylamine, a hydroxy-naphthylamine or an aminobenzene or a homologue thereof may be converted into the corresponding glucamine. The carbohydrate residue selected must, of course, be one which will ensure that the product of reaction of the carbohydrate and dyestuff former will have a sufficient solubility in water to permit of the compound formed being added to a photographic emulsion. In the case of celluloses of high molecular weight derivatives suitable for the introduction of residues into the dyestuff molecule for making the product fast to diffusion are especially ethers soluble in water or capable of swelling in water, for instance, methyl ethers or the cellulose ethers of hydroxycarboxylic acids, for example of glycolic acid or of glyconic acid or the carbohydrate compounds which are obtainable by treatment of cellulose or cellulose derivatives with ethylene oxide as described in German Patent No. 363,192.

As dyestuff components into which the carbohydrate residue may be introduced there may be used, for example, α-hydroxynaphthoic acid, β-hydroxynaphthoic acid, 2,3-hydroxyanthracene carboxylic acid, salicylic acid, hydroxyfluorene carboxylic acid, 2,3-hydroxycarbazole carboxylic acid, α-naphthol aldehyde; also dye formers with amino groups, such as amino benzenes, their homologues and analogues. The condensation products of the above named cellulose derivatives with dyestuff intermediates are in themselves formed or in the form of sodium salts soluble in water and quite fast to diffusion in gelatin.

By using carbohydrates of low molecular weight, for example dextrine, one obtains products which are directly soluble in water, but notwithstanding these are still sufficiently fast to diffusion. If monoses or lower polyoses are used as the carbohydrate residues the residue is not in itself capable of lending diffusion fastness in gelatin to the dyestuff intermediate. In this case, however, the object can be attained by introducing into the sugar residue a polymeric molecule group in addition to the dyestuff component; for example the product of the reaction of glucamine on α-hydroxynaphthoic acid is not fast to diffusion. On the other hand, if there is introduced into the amino-group of the glucamine a long polymeric ethylene imine chain by treatment with ethylene imine there is obtained a dyestuff intermediate fast to diffusion. A further possibility is to enhance the fastness to diffusion of the carbohydrate compound of the dyestuff intermediate by in part substituting hydroxyl groups with hydrocarbon chains, for example by esterifying with fatty acids or by the production of ethers.

The treatment with ethylene imine may be extended to other carbohydrates, for example to methyl cellulose, whereby a so-called animalized cellulose is obtained. The cellulose compounds thus obtained may be combined in the manner of an acid amide with the acid groups of a dyestuff intermediate, for example with 2.3-hydroxyfluorene carboxylic acid.

Furthermore carbohydrates like starch, substances resembling starch, dextrine or sugar, may be treated with ethylene oxide or a homologue or analogue thereof in the manner described in German Patent No. 368,413. The products thus obtained are suitable for reaction with dyestuff formers, particularly such as contain a carboxyl group, ester-like compounds being formed. Instead of the cellulose ethers, starch, dextrine, sugar or the like may be the parent material and even changed or regenerated cellulose. For example, a partially de-nitrated nitro-cellulose such as is present in the so-called Chardonnet silk may be treated with ethylene oxide whereby a water-soluble glycol ether is produced which may be introduced into the molecule of a dyestuff component and will render this fast to diffusion. For making such a glucoside-like compound may also be used a natural glucoside and a dyestuff component introduced into this glucoside residue.

The dyestuff components containing a carbohydrate residue may be added to the emulsion at any stage of its production. The silver halide emulsion containing the dyestuff former fast to diffusion may be worked up in known manner to produce the photographic layer which may be applied on one or both sides of a support in super-position; the layers may be sensitized for differing regions of the spectrum. Emulsions may be used in other manners, for example differently sensitized emulsions having different dye formers may be applied to a support in the form of small particles.

The color pictures may be produced in various ways, for example as described in one or another of the following U. S. Patents 2,179,228, 2,179,238 and 2,178,612, and U. S. patent application Ser. No. 94,340. Again the components located in multi-layer film may be converted into azo-dyes following development and fixing by treatment with a diazo compound such as a carbonic acid solution of tetrazotized benzidine disulfonic acid. There is thus produced in each emulsion layer together with a silver picture a dyestuff in which no structure can be perceived by magnification. The film is then treated with a silver bleaching out bath, i. e. that described in British Patent 401,340 to produce the dye image.

The following examples illustrate the invention:

(1) To 1 kilo of silver bromide emulsion are added 30 grams of the product of the reaction of cellulose methyl ether with α-hydroxynaphthoic acid chloride in aqueous solution and the emulsion is cast to form a layer. After exposure the layer is developed in a solution of aminodimethylaniline alkaline with sodium carbonate whereby a blue color picture is produced in addition to the silver picture.

(2) To 1 kilo of silver bromide emulsion there are added 30 grams of the product of the reaction of 2.3-hydroxyanthracene carboxylic acid with rice starch in aqueous solution and the emulsion is then cast to form a layer. After developing and fixing the silver image is converted in known manner into the silver antidiazotate of α-naphthylamine, whereupon after treatment with a weak acid a blue-red azo-dyestuff is produced beside the silver halide. After fixing there is obtained a blue-red azo-dyestuff image.

(3) 1 kilo of silver bromide emulsion is mixed with the product of the reaction of salicylic acid on the one hand and with glucamine treated with ethylene imine on the other hand and is then cast to form a layer. After developing and fixing the layer is bathed in a solution of tetrazotized benzidine-3.3'-disulfonic acid, acid with acetic acid. A yellow dyestuff is produced uniformly distributed in the layer; this is destroyed in known manner on the principle of the silver bleaching-out process at the parts of the layer containing the image whereby a yellow dyestuff picture remains.

What we claim is:

1. A photographic emulsion containing a color former fast to diffusion, said color former being capable of forming a dyestuff selected from the group consisting of quinoneimine-, azomethine-, and azo dyestuffs, and having a carbohydrate linked thereto.

2. A photographic emulsion containing a color former fast to diffusion, said color former being capable of forming a dyestuff selected from the group consisting of quinoneimine-, azomethine-, and azo dyestuffs, and being a carbohydrate ester of a color former.

3. A photographic emulsion containing a color former fast to diffusion, said color former being capable of forming a dyestuff selected from the group consisting of quinoneimine-, azomethine-, and azo dyestuffs, and being a carbohydrate ether of a color former.

4. A photographic emulsion containing a color former fast to diffusion, said color former being capable of forming a dyestuff selected from the group consisting of quinoneimine-, azomethine-, and azo dyestuffs, and being a carbohydrate acid amide of a color former.

5. A silver halide gelatin emulsion for color photography containing a color former fast to diffusion with respect to the gelatin, said color former being capable of forming a dyestuff in situ with the silver picture upon being contacted with a color forming developer, and having a carbohydrate linked thereto.

6. A silver halide gelatin emulsion for color photography containing a color former fast to diffusion with respect to the gelatin, said color former being capable of forming a dyestuff in situ with the silver picture upon being contacted with a color forming developer, and being a carbohydrate ester of a color former.

7. A silver halide gelatin emulsion for color photography containing a color former fast to diffusion with respect to the gelatin, said color former being capable of forming a dyestuff in situ with the silver picture upon being contacted with a color forming developer, and being a carbohydrate ether of a color former.

8. A silver halide gelatin emulsion for color photography containing a color former fast to diffusion with respect to the gelatin, said color former being capable of forming a dyestuff in situ with the silver picture upon being contacted with a color forming developer, and being a carbohydrate acid amide of a color former.

9. The photographic emulsion defined in claim 1, wherein the carbohydrate is linked to the color former by a linkage selected from the class consisting of a —CONH—, —O—,

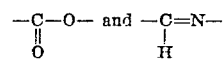

linkage.

10. The silver-halide gelatin emulsion defined in claim 5, wherein the carbohydrate is linked to the color former by a linkage selected from the class consisting of a —CONH—, —O—,

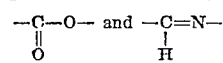

linkage.

11. The silver-halide gelatine emulsion defined in claim 5, wherein the carbohydrate is pretreated with a substance selected from the class consisting of ethylene oxide and ethylene imine.

12. The silver-halide gelatine emulsion defined in claim 5, wherein the carbohydrate is cellulose.

13. The silver-halide gelatine emulsion defined in claim 5, wherein the carbohydrate is dextrine.

14. The silver-halide gelatine emulsion defined in claim 5, wherein the carbohydrate is starch.

15. A silver-halide gelatine emulsion for color photography containing a color former fast to diffusion with respect to the gelatine, said color former being the reaction product of cellulose methylether with α-hydroxy naphthoic acid chloride.

16. A silver-halide gelatine emulsion for color photography containing a color former fast to diffusion with respect to the gelatine, said color former being the reaction product of 2.3-hydroxy-anthracene carboxylic acid with rice starch.

17. A silver-halide gelatine emulsion for color photography containing a color former fast to diffusion with respect to the gelatine, said color former being the reaction product of salicylic acid with glucamine pre-treated with ethylene imine.

WILHELM SCHNEIDER.
ALFRED FRÖHLICH.